(12) United States Patent
Calzada Gomez et al.

(10) Patent No.: US 11,403,312 B2
(45) Date of Patent: Aug. 2, 2022

(54) AUTOMATED RELEVANT EVENT DISCOVERY

(71) Applicant: Microsoft Technology Licensing, LLC., Redmond, WA (US)

(72) Inventors: Jose Ramon Calzada Gomez, Sammamish, WA (US); Peter Loren Engrav, Seattle, WA (US); Craig Allen Lee, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 706 days.

(21) Appl. No.: 15/069,806

(22) Filed: Mar. 14, 2016

(65) Prior Publication Data
US 2017/0262511 A1    Sep. 14, 2017

(51) Int. Cl.
*G06F 16/248*    (2019.01)
*G06F 16/951*    (2019.01)
*G06Q 10/10*    (2012.01)
*G06F 16/2458*    (2019.01)
*G06F 16/2457*    (2019.01)
*G06Q 10/02*    (2012.01)

(52) U.S. Cl.
CPC ........ *G06F 16/248* (2019.01); *G06F 16/2457* (2019.01); *G06F 16/2477* (2019.01); *G06F 16/951* (2019.01); *G06Q 10/02* (2013.01); *G06Q 10/10* (2013.01); *G06Q 10/109* (2013.01)

(58) Field of Classification Search
None
See application file for complete search history.

(56) References Cited

U.S. PATENT DOCUMENTS

| 5,790,974 | A | * | 8/1998 | Tognazzini | .......... | G01C 21/343 340/988 |
| 6,085,166 | A | | 7/2000 | Beckhardt et al. | | |
| 7,340,691 | B2 | * | 3/2008 | Bassett | ............... | G06Q 10/109 455/456.5 |
| 7,757,176 | B2 | * | 7/2010 | Vakil | .................... | G06Q 10/109 715/753 |
| 8,375,034 | B2 | * | 2/2013 | Norton | .................. | G06Q 10/02 707/748 |

(Continued)

FOREIGN PATENT DOCUMENTS

WO    2014210162 A1    12/2014

OTHER PUBLICATIONS

"International Search Report and written opinion Issued in PCT Application No. PCT/US2017/021017", dated Jun. 2, 2017, 12 pages.

(Continued)

*Primary Examiner* — Ashish Thomas
*Assistant Examiner* — Mellissa M. Ohba

(57) ABSTRACT

To improve efficiency of computing devices and improve the user experience thereon when searching for relevant events, the systems and methods disclosed herein provide event management and automated relevant event discovery. User information and event information are collected and stored, and events are searched for based on relevancy to a user. Relevancy to a user may be based at least in part on at least one of: non-conflict with calendar items in the user's calendar, location, the user's interests, the user's preferences and activity of the user's friends or contacts.

20 Claims, 11 Drawing Sheets

(56) References Cited

U.S. PATENT DOCUMENTS

| | | | | |
|---|---|---|---|---|
| 8,504,404 | B2* | 8/2013 | Norton | G01C 21/3484 |
| | | | | 705/7.19 |
| 8,533,266 | B2* | 9/2013 | Koulomzin | G06Q 50/01 |
| | | | | 709/204 |
| 8,626,627 | B2 | 1/2014 | Ransom et al. | |
| 8,845,428 | B2 | 9/2014 | Khan | |
| 8,914,483 | B1* | 12/2014 | Dixon | G06Q 10/1095 |
| | | | | 709/221 |
| 9,218,413 | B2* | 12/2015 | Skeen | H04N 21/4725 |
| 9,485,620 | B2* | 11/2016 | Henson | H04W 4/021 |
| 9,596,207 | B1* | 3/2017 | Lin | H04L 51/32 |
| 9,864,778 | B1* | 1/2018 | Strand | G06Q 30/0256 |
| 2003/0061303 | A1* | 3/2003 | Brown | G06Q 30/02 |
| | | | | 709/217 |
| 2003/0069899 | A1* | 4/2003 | Brown | G06Q 10/109 |
| 2003/0131059 | A1* | 7/2003 | Brown | G06Q 10/109 |
| | | | | 709/206 |
| 2004/0003042 | A1* | 1/2004 | Horvitz | G06Q 10/109 |
| | | | | 709/204 |
| 2008/0114716 | A1* | 5/2008 | Mock | G06Q 10/109 |
| 2008/0215348 | A1 | 9/2008 | Guldimann et al. | |
| 2009/0077183 | A1* | 3/2009 | Bruce | G06Q 10/107 |
| | | | | 709/206 |
| 2009/0165022 | A1* | 6/2009 | Madsen | G06Q 10/109 |
| | | | | 719/318 |
| 2009/0325556 | A1* | 12/2009 | Lee | H04W 68/04 |
| | | | | 455/414.2 |
| 2010/0269049 | A1* | 10/2010 | Fearon | G06Q 10/109 |
| | | | | 715/744 |
| 2010/0306119 | A1 | 12/2010 | Banerjee et al. | |
| 2011/0289422 | A1* | 11/2011 | Spivack | G06Q 10/109 |
| | | | | 715/739 |
| 2013/0325525 | A1 | 12/2013 | Boyd | |
| 2014/0058766 | A1 | 2/2014 | Yu et al. | |
| 2014/0067455 | A1* | 3/2014 | Zhang | G06Q 10/109 |
| | | | | 705/7.24 |
| 2014/0074536 | A1* | 3/2014 | Meushar | G06Q 10/1095 |
| | | | | 705/7.19 |
| 2014/0114943 | A1* | 4/2014 | Holenweger | G06F 16/951 |
| | | | | 707/706 |
| 2014/0173461 | A1 | 6/2014 | Shahade | |
| 2014/0278089 | A1* | 9/2014 | Gusikhin | G01C 21/00 |
| | | | | 701/533 |
| 2014/0358650 | A1 | 12/2014 | Basian et al. | |
| 2014/0372162 | A1* | 12/2014 | Dhara | G06Q 10/1095 |
| | | | | 705/7.19 |
| 2015/0019642 | A1* | 1/2015 | Wang | H04L 67/26 |
| | | | | 709/204 |
| 2015/0058324 | A1* | 2/2015 | Kauwe | G06F 16/284 |
| | | | | 707/722 |
| 2015/0149452 | A1* | 5/2015 | Warner | G06F 16/248 |
| | | | | 707/725 |
| 2015/0248651 | A1* | 9/2015 | Akutagawa | G06Q 50/01 |
| | | | | 705/7.19 |
| 2015/0262219 | A1* | 9/2015 | Vock | G06Q 30/0242 |
| | | | | 705/14.41 |
| 2015/0356693 | A1* | 12/2015 | Wiseman | G06Q 10/02 |
| | | | | 705/319 |
| 2016/0026934 | A1* | 1/2016 | Merhav | G06Q 10/02 |
| | | | | 705/5 |
| 2016/0110659 | A1* | 4/2016 | Skeen | G06Q 10/02 |
| | | | | 705/5 |
| 2016/0248865 | A1* | 8/2016 | Dotan-Cohen | H04L 67/26 |
| 2016/0249319 | A1* | 8/2016 | Dotan-Cohen | H04M 3/42365 |
| 2016/0267439 | A1* | 9/2016 | Bitran | G06Q 10/1095 |
| 2016/0275458 | A1* | 9/2016 | Meushar | G06Q 10/109 |
| 2016/0358065 | A1* | 12/2016 | Gedge | G06N 7/00 |
| 2017/0178034 | A1* | 6/2017 | Skeen | G06F 17/30389 |
| 2018/0013861 | A1* | 1/2018 | Howard | H04L 67/36 |

OTHER PUBLICATIONS

Zaman, Tehmina, "3 Ways To Connect Pinterest With Facebook & Twitter—And Why You Need To!", Published on: Oct. 3, 2012, Available at: http://epreneur.tv/connect-pinterest-with-facebook-twitter/.

Bizzabo, Retrieved on: Jul. 1, 2015, Available at: https://www.bizzabo.com/features.

"How to use Eventbrite's Promotional Tools", Published on: Jul. 6, 2014 Available at: http://help.eventbrite.com/customer/portal/articles/428637-how-to-use-eventbrite%E2%80%99s-promotional-tools.

"CrowdTorch", Retrieved on: Jul. 1, 2015, Available at: http://www.crowdtorch.com/features/social.shtml.

"EventUpload.io", Retrieved on: Jul. 1, 2015, Available at: https://www.eventupload.io/.

Sanchez, Cynthia , "Cross-Promote Your Way to Social Media Success", Published on: Apr. 16, 2013, Available at http://www.ohsopinteresting.com/cross-promote-your-way-to-social-media-success/.

"Tapcrowd for Events", Retrieved on: Jul. 1, 2015, Available at: http://tapcrowdevents.com/.

* cited by examiner

AUTOMATED RELEVANT EVENT DISCOVERY

BACKGROUND

Discovering events that are relevant to a user can be difficult. For example, a user may wish to find upcoming events at a particular venue, at a particular organization, at a particular location, at a particular time, etc. To find such events would likely involve using searching various websites, using various social media sites, using a search engine, stumbling onto advertising, and finding events that are not relevant to the user or events that are not relevant to the user due in part to the fact that the user would not be able to attend the events because of scheduling conflicts.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

To improve efficiency of computing devices and improve the user experience thereon when searching for relevant events, the systems and methods disclosed herein provide event management and automated relevant event discovery. User information and event information are collected and stored, and events are searched for based on relevancy to a user. Relevancy to a user may be based at least in part on at least one of: non-conflict with calendar items in the user's calendar, location, the user's interests, the user's preferences and activity of the user's friends or contacts.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
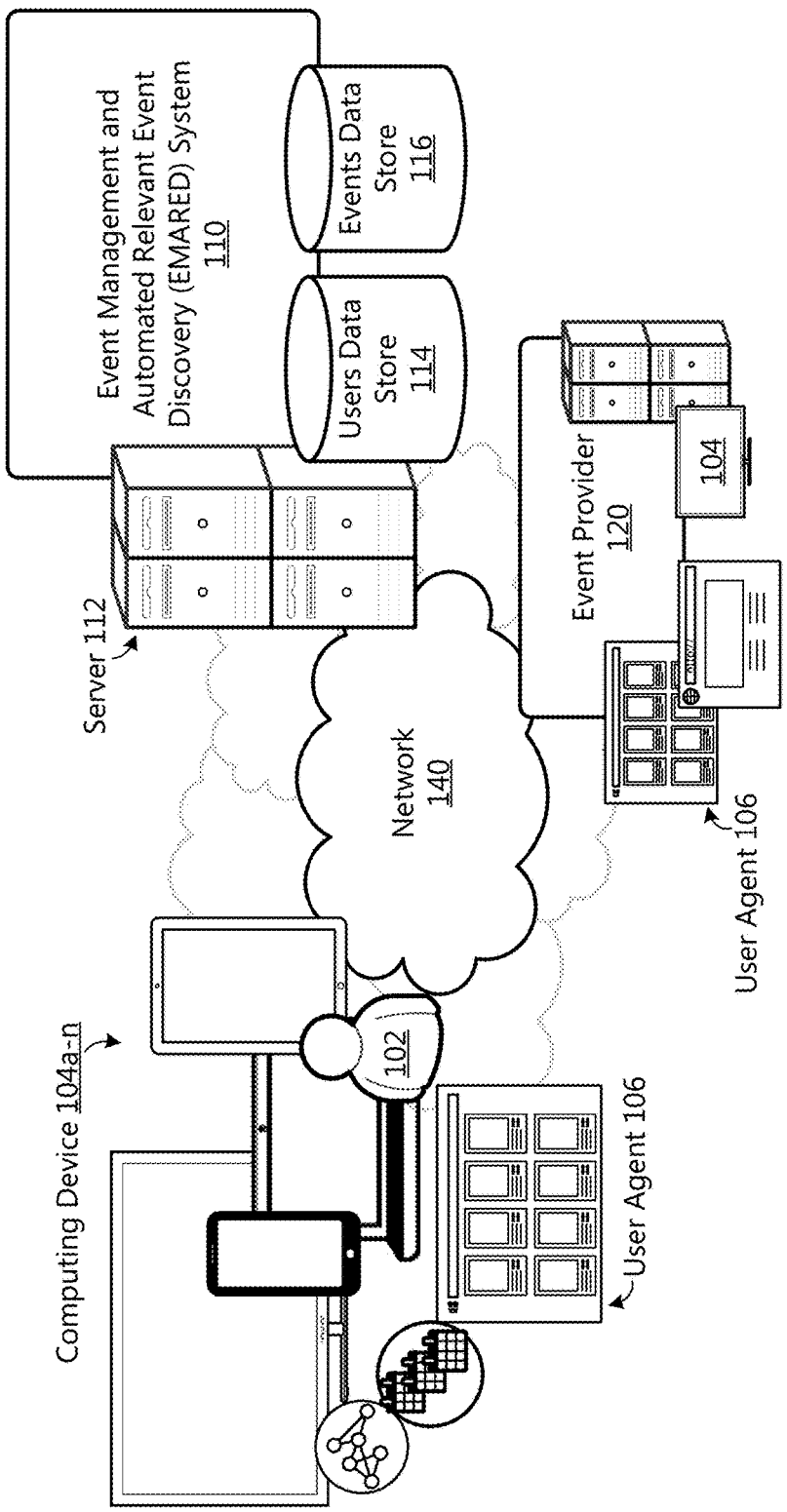
FIG. 1 is an illustration of an example system in which event management and automated relevant event discovery may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the systems and methods for event management and automated relevant event discovery are described herein and are illustrated in the accompanying figures. As used herein, ordinal terms (first, second, third, etc.) may be associated with various features or components of the present disclosure to distinguish them from each other, but one of ordinary skill in the art will appreciate that these terms do not necessarily impart a specific order to those features or components. For example, a first component may be any of a given type of component of a system, and a second component may be any of a given type of component of a system that is not the first component, unless explicitly stated otherwise. As will also be appreciated, ordinal terms, when apparent from the context in which they are used (e.g., when used to discuss timing) may reflect an ordered sequence. For example, a first time denotes a time occurring before a second, third, fourth, etc., time. Similar terms such as "given" or "particular" may also be used to distinguish features or components with similar names. In respect to the drawings, and their discussion herein, specific features or components will use a shared part number followed by a letter designator to distinguish them from one another, and the feature or component, when referred to in the general sense, will use the shared part number without a letter designator.

As described herein, systems and methods for event management and automated relevant event discovery are provided. The event management and automated relevant event discovery method and system eliminates inefficient and time-consuming searching for events across various sources. For example, rather than using a search engine, visiting various internal or external web sites, or having to cull through advertisements when trying to find events of interest, the event management and automated relevant event discovery method and system enables users to discover, share, and promote events within a single system, thus providing an improved user experience. Accordingly, the system reduces computing processing by reducing the number of searches that a computing device must perform for enabling the user to find various events offered by different event providers.

Additionally, the event management and automated relevant event discovery system automatically discovers events that are relevant to a particular user. Thus, the event management and automated relevant event discovery system enables the user to eliminate having to skim through search results of events that may appear to be responsive to the user's search, but that may not actually be relevant to the user (e.g., events that conflict with calendar items on the user's calendar). For example, by presenting the user with events that do not conflict with calendar items in the user's calendar, and that match criteria such as location, the user's interests, the user's preferences and activity of the user's friends or contacts, the event management and automated relevant event discovery system saves the user time, and reduces network traffic by reducing the number of searches performed for events of interest.

FIG. 1 is a block diagram illustrating an example system 100 in which event management and automated relevant event discovery may be practiced. The example system 100 includes two types of users: event participant users 102 and event providers 120. An event management and automated relevant event discovery (EMARED) system 110, illustrative of a software module or system, is optimized to enable event providers 120 to digitally create, share, promote, and manage events, to enable event participant users 102 to browse, share, and automatically discover events, and to provide a brokered communication mechanism between event providers 120 and event participant users 102. As should be appreciated, a user can be both an event participant user 102 and an event provider 120.

As illustrated, the example system 100 includes a first computing device 104a utilized by an event participant user 102 and a second computing device 104b utilized by an event provider 120. Non-limiting examples of computing devices (generally, 104) include a desktop computer, laptop computer, tablet computer, handheld computing device, mobile communication device, wearable device, gaming device, and the like. Further, the computing devices 104 are in communication with the EMARED system 110 via a network 140, such as the Internet, an intranet, a local area network, a wide area network, or combinations thereof. According to examples, the computing devices 104 communicate with the EMARED system 110 via a user agent 106 executing on the computing devices 104. In some examples, the user agent 106 is a web browser. In other examples, the user agent 106 is a special-purpose client application (e.g., web application, mobile application, stand-alone application used for event management or automated event discovery, application that is part of another application or productivity suite).

As an example and not by way of limitation, the EMARED system 110 is implemented in the form of a cloud-based service provided by a server 112, a network server, a desktop computer, a laptop computer, a tablet computer, a handheld computing device, a mobile communication device, and the like, and is optimized to provide event management and automated relevant event discovery. The server 112 may be located remotely from the local network of the computing device 104, for example, as a cloud server, in which case the network 140 represents the Internet or a Virtual Private Network (VPN) or other direct data link. The server 112 may also be located as part of the local network of the computing device 104, in which case the network 140 represents a Local Area Network (LAN) or private distributed network for an entity (e.g., a company, a university, a government agency). The EMARED system 110 is provided by the server 112 to authorized users and receives communications over the network 140 to receive event and user information, and to provide event management and automated relevant event discovery.

The server 112 is in communication with one or more data stores that store user data and event information. In some examples, an event provider 120 associated with a computing device 104 provides event information related to an event to the EMARED system 110, for example, via the EMARED application 106 associated with the EMARED system 110. An event may be defined as a planned occasion or activity, for example, an occasion or activity planned by an event provider 120. According to an aspect, an event may be one event within an event series, such as a single concert of a concert tour of a band. An event may be grouped into one or more event series, and an event series can have one event or a plurality of events.

As used herein, the term "event" may sometimes refer to a single event or an event series. For example, when describing receiving event information, the event information can include information for a single event or information for an event series. Event information related to an event includes various pieces of data, such as an event title, an event date and time, an event location, an event description, an image, cost, category (e.g., concert, art, sports, fitness, outdoors, food, nightlife, bars, shopping, religious), descriptive notes (e.g., reservations accepted, credit cards accepted, parking, ratings, appropriate for children, attire, ambience, noise level, alcohol, smoking), traits, link to a website (e.g., event provider's website, third-party ticketing website, venue website), and the like. According to an aspect, event information further includes RSVP information, for example, a list of event participant users 102 who have indicated that they are planning to attend a particular event or who have purchased tickets to a particular event. According to another aspect, event information includes photographs uploaded to the EMARED system 110 by event participant users 102 who attended a particular event.

In some examples, the EMARED system 110 mines for event information related to an event, for example, via crawling a network 140 for event information. According to one example, the EMARED system 110 collects event information from web pages associated with known event providers 120, such as event providers 120 associated with other events managed by the EMARED system 110 or event providers 120 who have a verified account (e.g., established authenticity of identity) with the EMARED system 110. According to another example, the EMARED system 110 collects event information from other network sources (e.g., web search engine service, third-party ticketing websites, venue websites, websites of known performers, entertainers, speakers, and organizations).

According to examples, user data include event provider 120 related data and event participant user 102 related data. User data may include information entered by a user (i.e., event provider 120, event participant user 102) and/or data collected from interaction with the EMARED system 110 by a user. For example, event provider 120 related user data include information associated with an event provider account associated with the EMARED system 110 (e.g., username, account login information) and other information, such as contact information, website address information, calendar information, social networking account(s) information, and the like. According to an example, event participant user 102 related data include various pieces of information, such as information associated with an event participant account associated with the EMARED system 110 (e.g., username, account login information) and other information, such as contact information, calendar(s) information, social networking account(s) information, location information, user demographic information, user preferences, event series subscriptions, event providers 120 that a particular event participant user 102 is following, contacts, and RSVPs. Event participant user related data may further include historical data, such as past events attended by a particular event participant user 102, events viewed by a particular event participant user 102, communications with other event participant users 102, communications with event providers 120, and the like.

As an example and not by way of limitation, the EMARED system 110 stores user data and event information in one or more data stores, for example, in a users data store 114 and in an events data store 116, respectively. In particular examples, each data store 114,116 comprises one or more storage devices. As will be appreciated, the server 112, the users data store 114, and the events data store 116 may be part of a distributed system and composed of a multitude of individual computing systems, and multiple computing devices 104 may be in communication with the EMARED system 110 for providing event or user information, for managing events, and for accessing and viewing event or user information.

Figure 2:
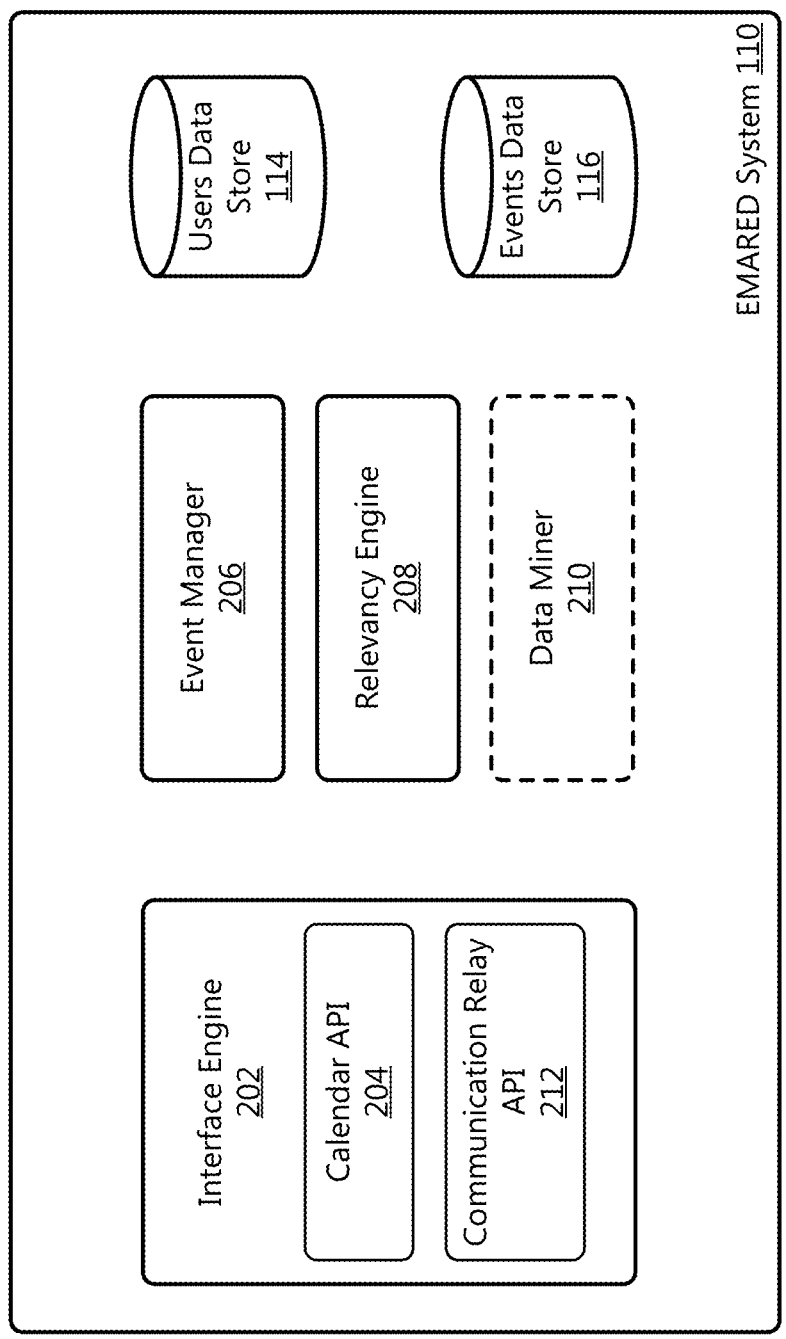
FIG. 2 is a simplified block diagram illustrating components of an example event management and automated relevant event discovery system.

With reference now to FIG. 2, a block diagram of various components of an example EMARED system 110 is illustrated. According to examples, the EMARED system 110 includes an interface engine 202, an event manager 206, a relevancy engine 208, the users data store 114, the events data store 116, and an optional data miner 210. According to examples, the interface engine 202 is operative to provide one or more application programming interfaces (APIs), such as XML-based APIs, enabling the user agent 106 to access various functionalities of the EMARED system 110 through the network 140.

According to an example, the EMARED system 110, via the interface engine 202, provides user interfaces for enabling event providers 120 and event participant users 102 to sign up for and sign into an account with the EMARED system 110. For example, the interface engine 202 is in communication with the users data store 114, and is operative to generate user interfaces for receiving user credentials, such as a username and password or other information that proves the identity of the user, and to authenticate the user credentials against user information stored in the users data store 114 for allowing access to event creation, management, and discovery functionalities of the EMARED system 110. The interface engine 202 is further operative to store received user data in the users data store 114.

According to an example, the interface engine 202 provides user interfaces for enabling an event provider 120 to enter event information related to an event to "post" for exposure to event participant users 102, and for managing event information related to the event. For example, the interface engine 202 is operative to generate and provide user interfaces for receiving such event or event series information as: an event title, an event date and time, an event location, an event description, images, videos, audio, cost, category (e.g., concert, art, sports, fitness, outdoors, food, nightlife, bars, shopping, religious), descriptive notes (e.g., reservations accepted, credit cards accepted, parking, ratings, appropriate for children, attire, ambience, noise level, alcohol, smoking), traits, link to a website (e.g., event provider's website, third-party ticketing website, venue website), and the like.

In some examples, the EMARED system 110 includes a data miner 210, illustrative of a software module, system, or device operative to mine various sources for event information related to an event or an event series. For example, the data miner 210 is operative to crawl a network 140 for event information, collect event information from web pages associated with known event providers 120 (e.g., event providers 120 associated with other events managed by the EMARED system 110, event providers 120 who have a verified account with the EMARED system 110), collect event information from other network sources (e.g., web search engine service, third-party ticketing websites, venue websites, websites of known performers, entertainers, speakers, and organizations), etc.

In some examples, a browser extension may be installed or a button may be embedded in a webpage that communicates event information via an application programming interface with the EMARED system 110. For example, when a browser extension button or an embedded button is selected, event information on the webpage is extracted and transmitted to the EMARED system 110. In some examples, an event is created from the event information, and is posted for event participant users 102 to discover or for the EMARED system 110 to discover for event participant users 102 based on relevancy to the users. In some examples, an event is created for only the user who selected to extract and transmit the event information to the EMARED system 110, wherein the event is created and posted to an event board managed by the user.

The interface engine 202 and the data miner 210 are in communication with the event manager 206, illustrative of a software module, system, or device operative to generate an event from event information, and store the event and associated event information in the events data store 116. In some examples, the event manager 206 indexes events and associated event information, and is operative to categorize events based on various factors.

According to some examples, the interface engine 202 is further operative to generate and provide user interfaces for enabling event participant users 102 to define various user preferences, enter location information, provide information for integrating one or more calendars, provide information for linking one or more social networking accounts, provide friends or contacts information, and the like. The interface engine 202 is further operative to generate and provide user interfaces for enabling event participant users 102 to browse events, interact with events, and provide information to associate with an event. For example, the interface engine 202 is operative to generate and provide a user interface for displaying event information associated with one or more events. According to an example, as a starting point after the event participant user 102 logs into the EMARED system 110 or in response to a selection by the event participant user 102 to view upcoming events, the interface engine 202 is operative to generate and provide a user interface displaying one or more upcoming events and one or more pieces of associated event information.

As can be appreciated, the interface engine 202 is further operative to generate and provide a user interface for allowing event participant users 102 to select to view specific events, to select search criteria, or to enter search criteria for specific events matching the search criteria. As another example, a selection by the event participant user 102 to view upcoming events can include a selection to view events of a particular category (e.g., concert, art, sports, fitness, outdoors, food, nightlife, bars, shopping, religious), events near a particular location, events on a particular date or within a particular time frame, events including a specific word or words, events meeting specific search criteria, etc.

In some examples, as a starting point after identifying the event participant user 102 or in response to a selection by the event participant user 102 to view upcoming events, the interface engine 202 is operative to generate and provide a user interface for displaying one or more events that are determined to be relevant to the particular event participant user 102. According to an aspect, events that are determined to be relevant to a particular event participant user 102 include at least one of: events that match user preferences (e.g., user-selected user preferences, learned user preferences), events near the user's location (e.g., user-entered, identified, learned), events that do not conflict with scheduled events or appointments in the user's calendar(s), events that are selected as events of interest by friends or contacts of the user, and events that friends or contacts of the user are planning to attended. In some examples, events are displayed as cards comprising various pieces of event information, which will be described below in further detail.

According to examples, the interface engine 202 is further operative to generate and provide user interfaces via the user agent 106 for enabling the event participant user 102 to interact with events, for example, to view events and event information, tag, bookmark, or track events the event participant user 102 is interested in (i.e., events of interest), subscribe to event series, follow event providers 120, share events, view other event participant users' events of interest, RSVP to events, upload photographs, audio clips, or video clips taken at an event, chat with other event participant users 102 about an event, and the like. Information associated with an event participant user's interaction with an event is stored in the users data store 114 and/or the events data store 116, and can be used by the relevancy engine 208 for determining relevant events to provide to a particular event participant user 102.

According to an example, like a physical bulletin board hanging on a wall or a utility pole on a street corner where bands, groups, or organizations post bills in an effort to get the word out about an upcoming concert, class, seminar, or other event, the EMARED system 110 provides a mechanism for managing events into groups (e.g., "electronic utility poles," "poles," or "boards"), herein referred to as "poles," that can be viewed by the event participant user 102 and shared with other users. An event participant user 102 is able to track events of interest by posting events to one or more "poles" that the event participant user manages.

For example, an event participant user 102 may select a functionality displayed in a user interface associated with a particular event, the selection of the particular functionality indicating that the event participant user 102 wants to tag or bookmark the event. Accordingly, the interface engine 202 is operative to communicate the user's selection with the event manager 206, such that the event can be classified as an event of interest for the user 102, and is added to a "pole" associated with and managed by the user 102. The event participant user 102 is able to share one or more "poles" with friends or contacts. According to an example, the event participant user 102 is able to view other users' "poles," and can post events included in another user's "pole" to a "pole" that the event participant user 102 manages.

According to an aspect, the interface engine 202 is operative to generate and provide a user interface via the user agent 106 for enabling the event participant user 102 to share photos, audio clips, video clips, and conversations with other event participant users. For example, via the EMARED system 110, when an event participant user 102 takes a picture or records audio or video at an event, the EMARED system 110 is operative to create a memory space for the event, where pictures, audio clips, video clips, and messages are compiled and shared between the event participant user 102 and the user's friends, contacts, other event participants, or the event provider 120.

In some examples, the EMARED application 106 provides a user interface for enabling anonymous communication between event participant users 102 and event providers 120. For example, a relay communication application programming interface 212 is provided by the interface engine 202 for enabling an event participant user 102 to send a communication, such as an email, text, or an instant message to an event provider anonymously via using a cloaked address rather than the event participant user's actual address. According to an aspect, when an event provider 120 creates an event, an anonymized communication address is created specifically for the posting. When an event participant user 102 selects to send a communication to the event provider 120, the communication is sent to the anonymized communication address, then forwarded to the event provider 120. Replies are also sent to the EMARED system 110, then forwarded to the event participant user 102. Accordingly, the event provider 120 and the event participant user 102 are able to protect their identities, for example, to prevent unwanted advertisements or to protect their email addresses from spammers who troll the site looking for email addresses to harvest.

In some examples, the interface engine 202 includes a calendar application programming interface 204 that provides a communication channel between the EMARED system 110 and the event participant user's calendaring application. For example, when the event participant user 102 selects to attend an event, a calendar item associated with the event is automatically added to the user's calendar. According to an aspect, the calendar item is linked to an event card associated with the event. As another example, when a change is made to an event (e.g., scheduling change, location change) that has been added to an event participant user's calendar, the EMARED system 110, via the calendar application programming interface 204, is able to update the calendar item with the changed information. According to an aspect, when a calendar item is updated, various effects may be applied to the calendar item, for example, visual effects to attract the attention of the event participant user 102.

According to examples, the interface engine 202 is operative to generate and provide a user interface via the user agent 106 for communicating event interaction data with the event provider 120 associated with the event. For example, an event provider 120 is enabled to see how many event participant users 102 have viewed an event, posted an event to a "pole," subscribed to an event series, have RSVPed to an event, shared an event with friends or contacts, etc. In some examples, if an event participant user 102 has selected to share personal information with the event provider 120, the event provider 120 is enabled to send communications, such as emails, texts, notifications, or calendar behaviors to the event participant user 102.

According to examples, the interface engine 202 is in communication with the relevancy engine 208, illustrative of a software module, system, or device operative to determine events that are relevant to an event participant user 102 based on a relevancy score. According to an aspect, the relevancy engine 208 is operative to calculate the relevancy score based on various weighted relevancy factors. The relevancy engine 208 is in communication with the users data store 114 and the events data store 116, where the relevancy engine 208 is operative to retrieve various pieces of data for calculating relevancy scores and to store relevancy score data associated with an event participant user 102 and an event.

In one example, the relevancy engine 208 is operative to identify matches between event information elements and user preference elements, and calculate a first relevancy score for the identified matches. User preferences may either be selected or entered by an event participant user 102, for example, via a user interface generated and provided by the interface engine 202, or learned via the EMARED system 110, for example, based on events viewed by the event participant user 102, based on events selected as events of interest by the event participant user 102, based on event providers 120 followed by the event participant user 102, based on selections to navigate to websites associated with an event or an event provider 120, and based on events previously attended by the event participant user 102 (e.g., events RSVPed by the event participant user 102, event tickets purchased via the EMARED system 110), etc. According to an aspect, user preference elements may have different weights associated with them. For example, for a particular event participant user 102, a sporting event may have a higher weight than a music concert or, as another example, a higher weight may be associated with an event that is kid-friendly as compared to an event that is not kid-friendly.

In another example, the relevancy engine 208 is operative to identify matches between event locations of events and the event participant user's 102 location, and calculate a second relevancy score for the identified matches. The event participant user's 102 location may be based on user-entered location information, for example, via a user interface generated and provided via the interface engine 202, may be based on identified location information, for example, via GPS data, user data (e.g., the event participant user's address, preferred location(s)), or may be based on learned location information, for example, linked calendar information (e.g., information in the event participant user's calendar(s) associating the event participant user with locations on specific dates).

In another example, the relevancy engine 208 is operative to identify matches between dates and times of events and the event participant user's availability, and calculate a third relevancy score for identified matches. The event participant user's availability may be determined according to one or more linked calendars. According to an example, the EMARED system 110 includes a calendar application programming interface 204 operative to query event participant user's calendar(s) selectively linked to the EMARED system 110 for scheduled events and appointments, and determine scheduling conflicts between events and the user's schedule. The relevancy engine 208 is operative to calculate a relevancy score based on whether the event participant user 102 is available to attend the event according to the calendar information.

In another example, the relevancy engine 208 is operative to calculate a fourth relevancy score for matches between events and events selected as an event of interest by a friend or contact of the event participant user 102. The relevancy engine 208 is operative to identify events that have been tagged, bookmarked, or otherwise selected by a friend or contact of the event participant user 102, and calculate a score for the event based on interest in the event by the friend or contact. For example, the event participant user 102 may link one or more social networking accounts or contacts lists with the EMARED system 110 via the interface engine 202 for accessing contacts and friends information. As another example, the event participant user 102 may select or enter contacts or friends information into the EMARED system 110, for example, via a user interface generated and provided by interface engine 202.

According to an example, the relevancy engine 208 is operative to assign a higher weight for events selected by a higher number of friends or contacts. According to another example, different weights may be assigned based on the friend or contact of the event participant user 102. For example, an event participant user 102 may select for certain friends or contacts to have more impact on the relevance of an event to the event participant user 102. According to another example, the EMARED system 110 is operative to determine weights for friends' or contacts' events of interest based on a learned relationship level between the event participant user 102 and the particular friend or contact (e.g., based on a number of communications, based on a similarity in user preferences, viewing history, interest history, previously attended events, relationship type).

According to an aspect, the EMARED system 110, via the interface engine 202, is enabled to query a graph, such as the DELVE™ management tool, available from MICROSOFT CORPORATION of Redmond, Wash., to discover connections between an event participant user 102 and persons in an enterprise so as to determine relationship levels or types for calculating a relevance score for an event based on activity associated with the event by friends or contacts of the event participant user 102.

In another example, the relevancy engine 208 is operative to calculate a fifth relevancy score for matches between events and events specified as an event that a friend or contact of the event participant user 102 is planning to attend. For example, the relevancy engine 208 is operative to identify events that a friend or contact has indicated through the EMARED system 110 that the friend or contact is planning to attend (e.g., selection of an "RSVP" element, selection of an "I'm going" element). As another example, the relevancy engine 208 is operative to identify events for which a friend or contact has purchased tickets. The relevancy engine 208 is further operative to calculate a score for the event based on attendance of the event by a friend or contact. In some examples, the score is based on a number of friends or contacts who are planning to attend the event. In other examples, the score is based on a relationship type or level the event participant user 102 has with the friend or contact planning to attend the event.

Figure 3:
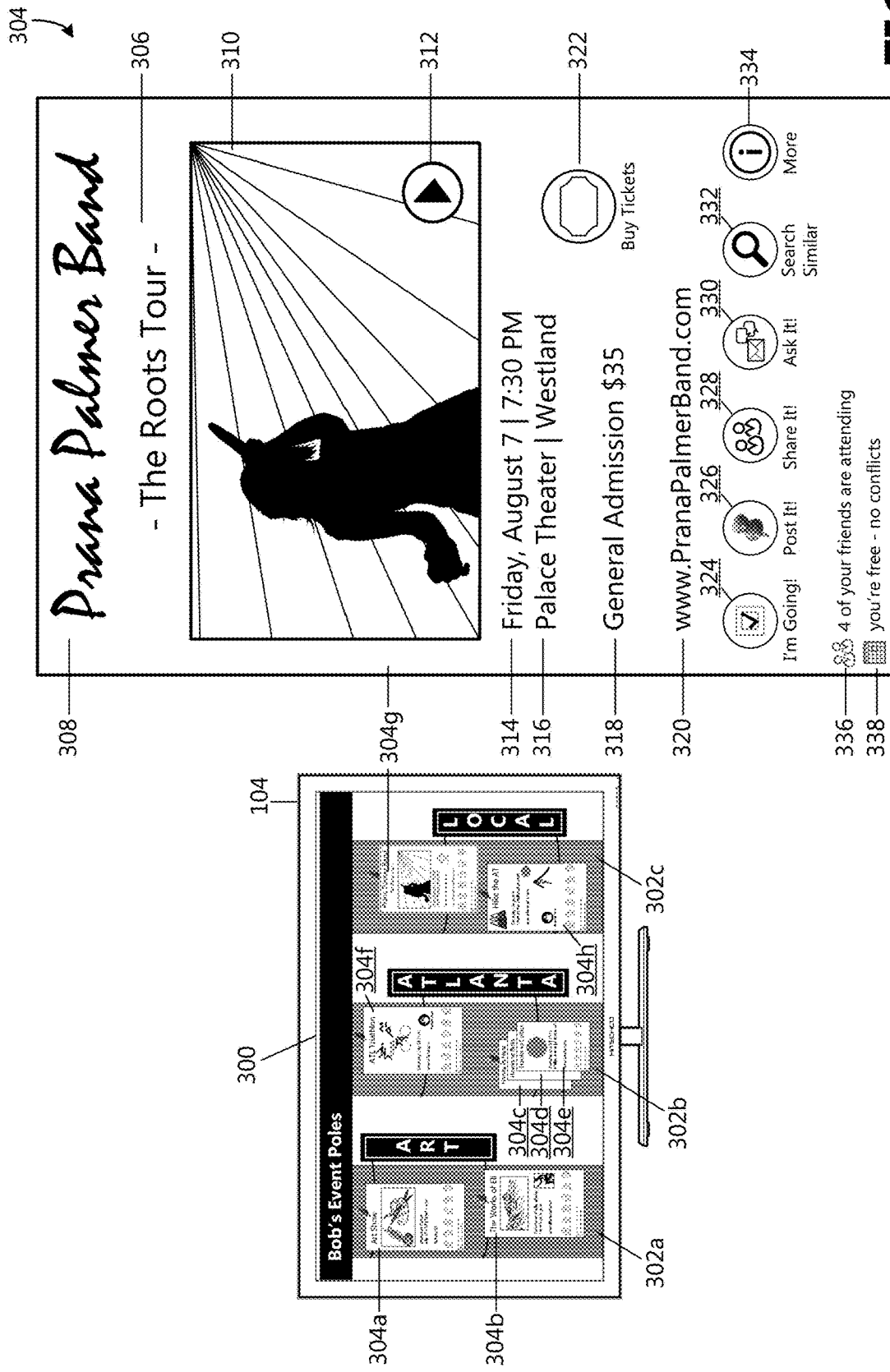
FIG. 3 is an illustration showing example event cards displayed on event poles for managing events of interest on an example computing device.

With reference now to FIG. 3, an illustration is provided of an example user interface 300 displayed on a computing device 104, the user interface 300 including a display of "poles" 302a-c (generally, 302) managed by an event participant user 102, the "poles" 302 comprising a plurality of events of interest to the user. As illustrated, an event participant user 102 may manage one or more "poles" 302, representative of groupings of events that are of interest to the event participant user 102. According to an example, a "pole" 302 may be associated with a specific category or classification of events. For example and as illustrated, a first "pole" 302a may include events related to a specific category, such as art events, and a second and third "pole" 302*b,c* may include events related to specific locations, such as Atlanta and local.

In some examples, the events may be represented by event cards 304*a-h* (generally, 304) that may be identifiable via a uniform resource locator (URL). Each event card 304 includes event data that are stored in the events data store 114. As illustrated, an event card 304 may include one or more event information elements, such as one or more of: the title 306 of the event, a name 308 of the performer, entertainer, speaker, or organization associated with the event, an image 310, audio clip, or video clip 312, an event date and time 314, an event location 316, an admission price 318, and a link to a website 320 of the performer, entertainer, speaker, or organization associated with the event.

In some examples, various selectable functionalities may be provided, such as a functionality to purchase tickets 322 to the event, a functionality to RSVP 324 to the event, a functionality to post 326 the event to a "pole" 302, a functionality to share 328 the event with friends or contacts, a functionality to send a communication 330 to the event provider 120, a functionality to search 332 for similar events, and a functionality to see more 334 options. According to an aspect, an event card 304 may include additional information, such as a notification 336 of a number of friends or contacts of the event participant user 102 that are planning to attend the event and a notification 338 that the event does not conflict with any calendar items in the event participant user's linked calendar(s). In some examples, the notifications 336,338 may be selectable. For example, when the event participant user 102 selects the notification 336 of the number of friends or contacts that are attending the event, a listing of the friends or are planning to attend the event are displayed. As another example, when the event participant user 102 selects the notification 338 that the event does not conflict with any calendar items in the event participant user's linked calendar(s), the user's calendar(s) may be displayed.

Figure 4:
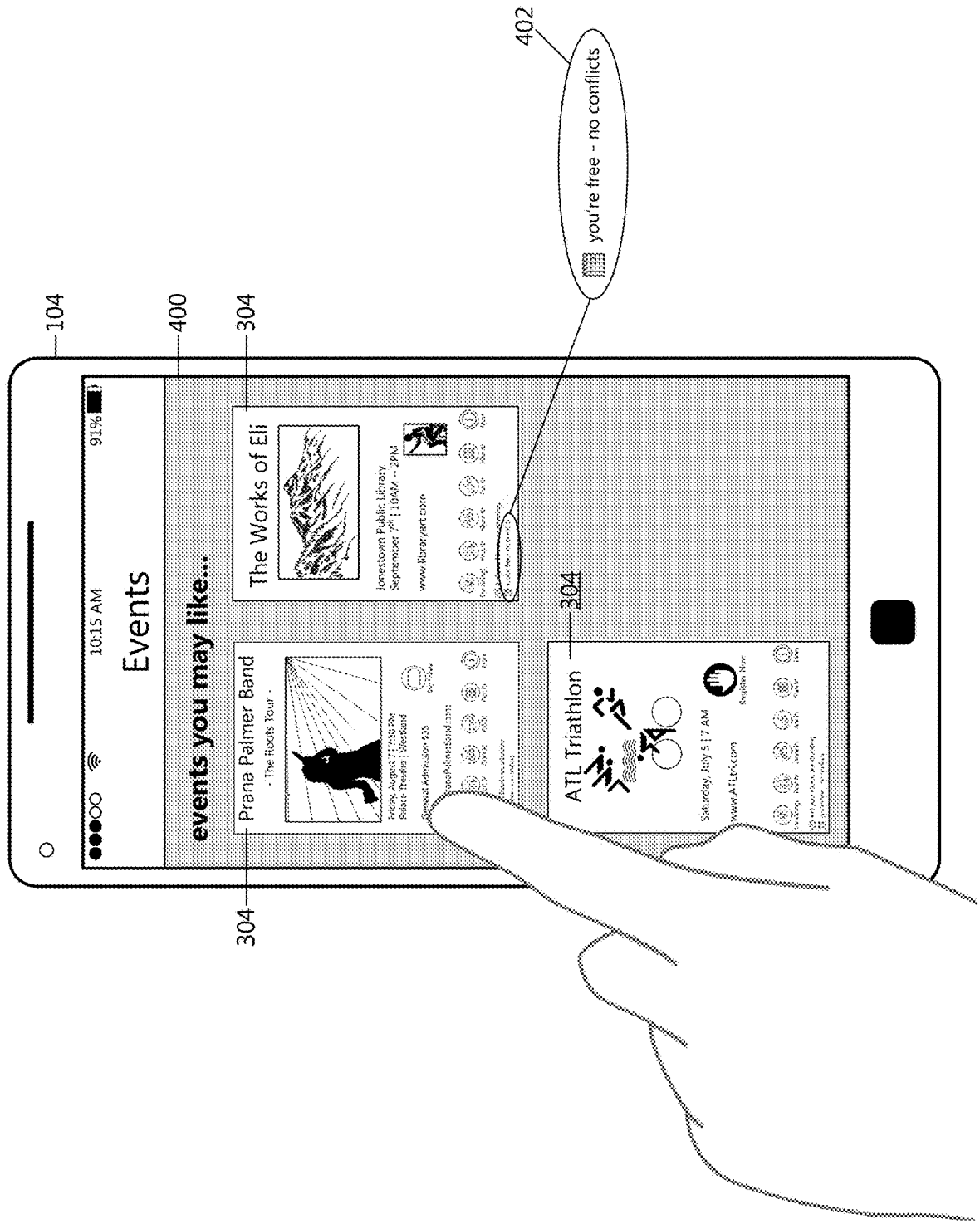
FIG. 4 is an illustration showing example relevant events automatically discovered for a user on an example computing device.

With reference now to FIG. 4, an illustration is provided of an example user interface 400 displayed on a computing device 104, the user interface 400 including a display of event cards 304 representative of a plurality of relevant events automatically discovered for an event participant user 102 based on one or more relevance factors. For example, a relevance score is calculated for events by the EMARED system 110 based on the one or more relevance factors. According to an aspect, an event participant user's availability 402 according to the user's calendar data is an example of a relevance factor for determining relevance of an event for the event participant user 102. Other examples of relevance factors may include: user preferences, location, interaction data (e.g., events viewed, events RSVPed, events attended, events shared, events tagged, events viewed, RSVPed, attended, shared by friends of the user), etc.

Figure 5:
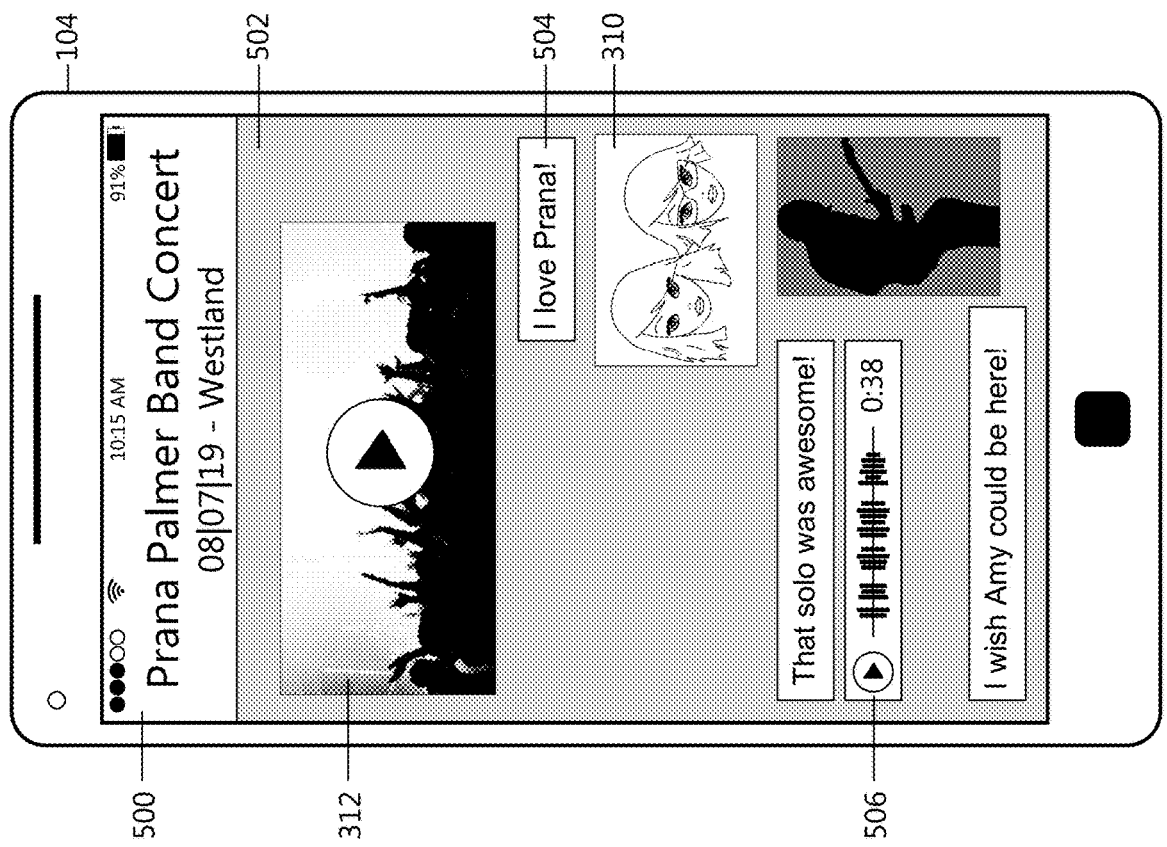
FIG. 5 is an illustration showing an example album automatically generated for a group of users on an example computing device.

With reference now to FIG. 5, an illustration is provided of an example user interface 500 displayed on a computing device 104, the user interface 500 including a display of an album 502 generated by the EMARED system 110. According to an aspect, the EMARED system 110 is operative to create an album 502 comprising various images 310, videos 312, audio recordings 506, or messages 504 uploaded to the EMARED system 110 via the event participant user 102, the user's friends or contacts, other event participants, or the event provider 120.

Figure 6:
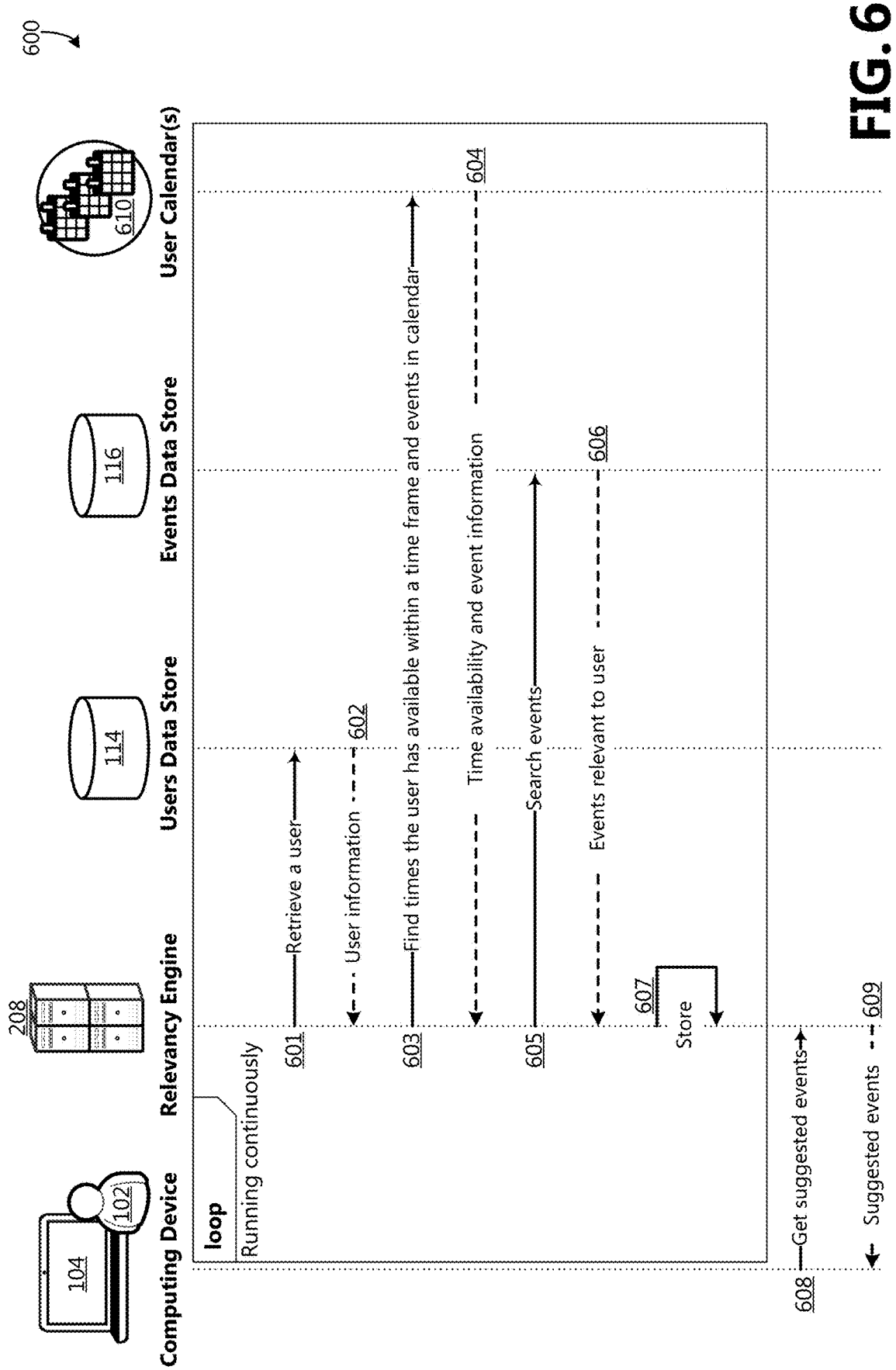
FIG. 6 is a time sequence diagram showing general stages involved in an example method for automated relevant event discovery.

FIG. 6 is a time sequence diagram showing general stages involved in an example method 600 for automated relevant event discovery. At 601, the relevancy engine 208 requests user information for a user (i.e., event participant user 102) from the users data store 114, and at 602, the event participant user's 102 receives the user information. For example, user information may include location information (e.g., user's last known location, frequent locations, upcoming planned locations), user preferences, user interests, etc.

At 603, the relevancy engine 208 queries the event participant user's linked calendar(s) 610 for times the user has available within a predefined time frame (e.g., upcoming week, in the next month) and for events scheduled in the user's calendar(s) 610, and at 604, the relevancy engine 208 receives the event participant user's time availability and event information from the user's calendar(s) 610.

At 605, the relevancy engine 208 queries the events data store 116 for events based at least in part on the user information, user preferences, the user's available time, and related events in the event participant user's calendar(s) 610, and at 606, the relevancy engine 208 receives the query results and determines one or more events that are relevant to the event participant user 102. As one example, the relevancy engine 208 queries for or filters out events that conflict with other events in the user's calendar 610. As another example, the relevancy engine 208 queries for or filters out events occurring more than a user-specified distance or a pre-defined distance from the event participant user's frequent locations, last known location, or planned locations. As another example, the relevancy engine 208 queries for or prioritizes events based on the event participant user's preferred categories (e.g., music concert, magic shows, comedians, symphonies). As another example, the relevancy engine 208 queries for or prioritizes events based on how many of the event's tags or keywords match the event participant user's interests. As another example, the relevancy engine 208 queries for or prioritizes events based on whether the event participant user 102 has attended related events. According to an example, in prioritizing events, the relevancy engine 208 is operative to calculate relevancy scores for the events.

At 607, the relevancy engine 208 stores the determined relevant events and associated relevancy scores. Steps 601-607 run continuously in a loop. At 608, the client (i.e., user agent 106 executing on a computing device 104 associated with the event participant user 102) requests relevant events for the event participant user 102, and at 609, the relevancy engine 208 provides the relevant events for display to the event participant user 102. According to one example, the relevant events are displayed according to relevance to the event participant user 102 as determined by the calculated relevancy scores.

Figure 7:
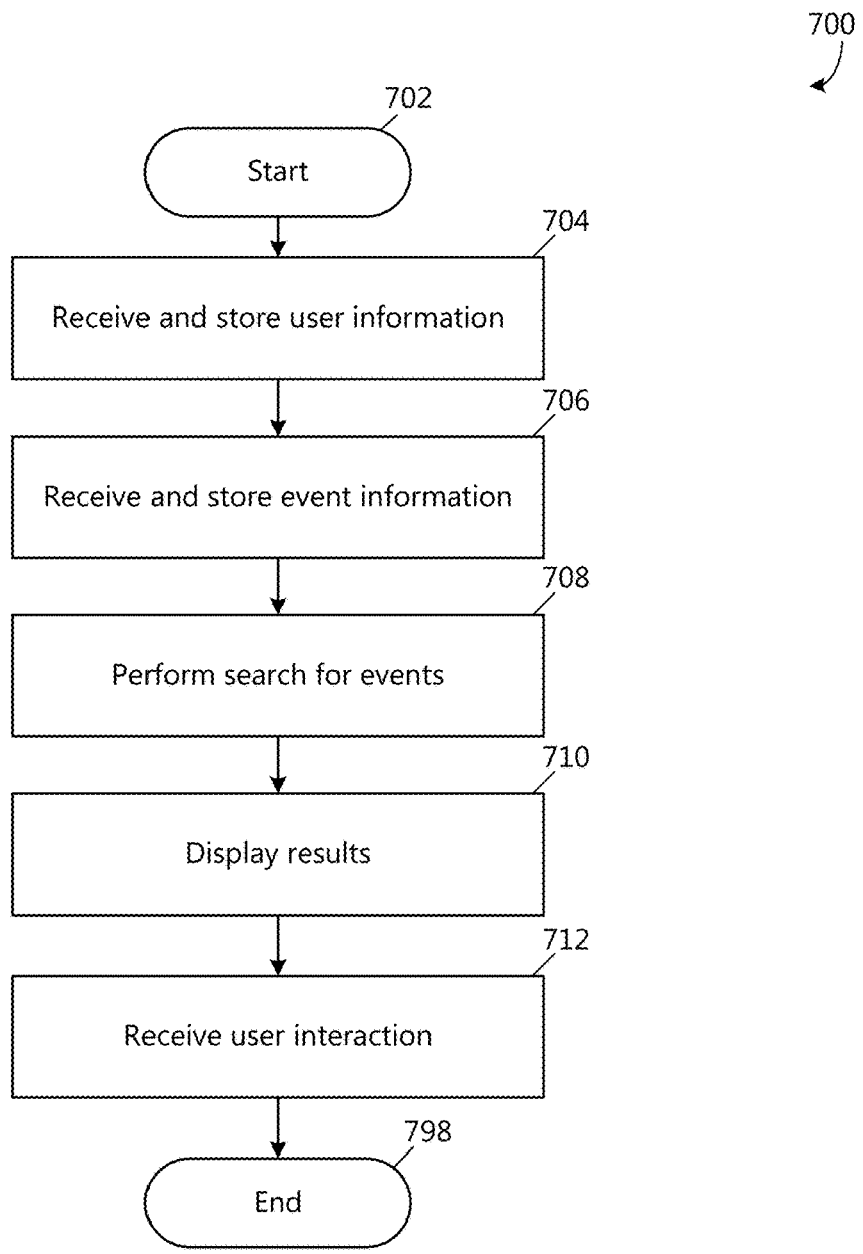
FIG. 7 is a flow chart showing general stages involved in an example method for event management and automated relevant event discovery.

FIG. 7 is a flow chart showing general stages involved in an example method 700 for event management and automated relevant event discovery. With reference now to FIG. 7, the method 700 begins at start OPERATION 702, and proceeds to OPERATION 704, where the EMARED system 110 receives user information and stores the information in the users data store 114. For example, user information can include event provider 120 user data or event participant user 102 user data. In one example, the EMARED system 110 provides a user interface to allow a user to input user information. As described above, user information may include such information as: information associated with an event provider account or an event participant user account associated with the EMARED system 110 (e.g., username, account login information), contact information, website address information, calendar information, social networking account(s) information, location information, user demographic information, user preferences, events of interest, event series subscriptions, event providers 120 that a particular event participant user 102 is following, contacts, RSVPs, and the like.

The method 700 proceeds to OPERATION 706, where the EMARED system 110 receives event information and stores the information in the events data store 116. In one example, the EMARED system 110 provides a user interface to allow a user to input event information. In one example, the EMARED system 110 collects event information, for example, via a web crawler. In another example, event information is collected via an application programming interface in response to a selection of a browser extension functionality or an embedded button on a webpage. As described above, event information includes information associated with an event, such as: an event title, an event date and time, an event location, an event description, an image, cost, category (e.g., concert, art, sports, fitness, outdoors, food, nightlife, bars, shopping, religious), descriptive notes (e.g., reservations accepted, credit cards accepted, parking, ratings, appropriate for children, attire, ambience, noise level, alcohol, smoking), traits, link to a website (e.g., event provider's website, third-party ticketing website, venue website), whether the event is part of an event series, and the like.

The method 700 proceeds to OPERATION 708, where the EMARED system 110 performs a search for events to display to an event participant user 102. According to one example, the EMARED system 110 performs a search for events in response to an event participant user 102 selecting to browse for events meeting one or more search criteria via a user interface generated and provided by the interface engine 202. For example, the EMARED system 110 is operative to perform a search for events matching certain location criteria (e.g., nearby, within 20 miles, in Chicago), matching certain scheduling criteria (e.g., on a certain day, on a certain weekend, within a certain week), matching a certain event category (e.g., musical concert, sporting event, fitness event, religious event), or matching other criteria (e.g., search term, takes reservations, kid-friendly, pet-friendly, smoking allowed, black tie). As another example, the EMARED system 110 performs a search for events that are events of interest to the user, for example, events that the event participant user 102 is tracking via posting the events to a "pole" 302.

According to one example, the EMARED system 110 performs a search for events based at least in part on relevancy of the events to the event participant user 102. For example, the user agent 106 may make a request to the relevancy engine 208 for relevant events determined by the relevancy engine 208 as described above with respect to FIG. 6. For example, the relevancy engine 208 associated with the EMARED system 110 calculates relevancy scores based on one or more relevancy factors. According to one example, the relevancy engine 208 determines relevancy of an event to an event participant user 102 based at least in part on whether the user is able to attend the event according to scheduling data associated with one or more calendar(s) linked to the EMARED system 110. According to another example, the relevancy engine 208 determines relevancy of an event to an event participant user 102 based on one or more other relevancy factors (e.g., matching user preferences, user history, friends' activities, friends' history).

The method 700 continues to OPERATION 710, where one or more events are displayed. In one example, the events are displayed according to the relevance scores. For example, the user interface may display the top five events for the event participant user 102 to view. According to an aspect, the events may be displayed as event cards 304, and may include additional information related to the events. According to one example, an event card 304 may include additional information, such as a notification 336 of a number of friends or contacts of the event participant user 102 that are planning to attend the event and a notification 338 that the event does not conflict with any calendar items in the event participant user's linked calendar(s).

The method 700 proceeds to OPERATION 712, where user interaction is received. In one example, the event participant user 102 selects a ticket purchasing 322 functionality to purchase tickets to an event. In another example, the event participant user 102 selects a post 326 functionality to post an event to a "pole" 302, for example, to track the event with one or more other events in which the user is interested. In another example, the event participant user 102 selects an RSVP 324 functionality to RSVP to an event. According to an example, as a result, the event is added to the user's calendar. In another example, the event participant user 102 selects a share 328 functionality to share an event with friends or contacts. In another example, the event participant user 102 selects a communication 330 functionality to send a communication to the event provider 120. In another example, the event participant user 102 selects a search 332 functionality to search for similar events. In another example, the event participant user 102 selects a link to a website 320 of the performer, entertainer, speaker, or organization associated with an event. In another example, the event participant user 102 selects a more 334 functionality to see more event interaction options.

According to another example, the event participant user 102 may create an album 502 associated with an event that the user is attending. For example, the event participant user 102 (and other users) may post photos 310, videos 312, audio clips 506, or messages 310 to the EMARED system 110 for creating a memory space or album of the event. According to another example, an event provider 120 may select to view activity associated with an event posted by the event provider 120. For example, the event provider 120 may view a number of RSVPs to the event, communicate with an event participant user 102, modify event information, etc. The method ends at OPERATION 798.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
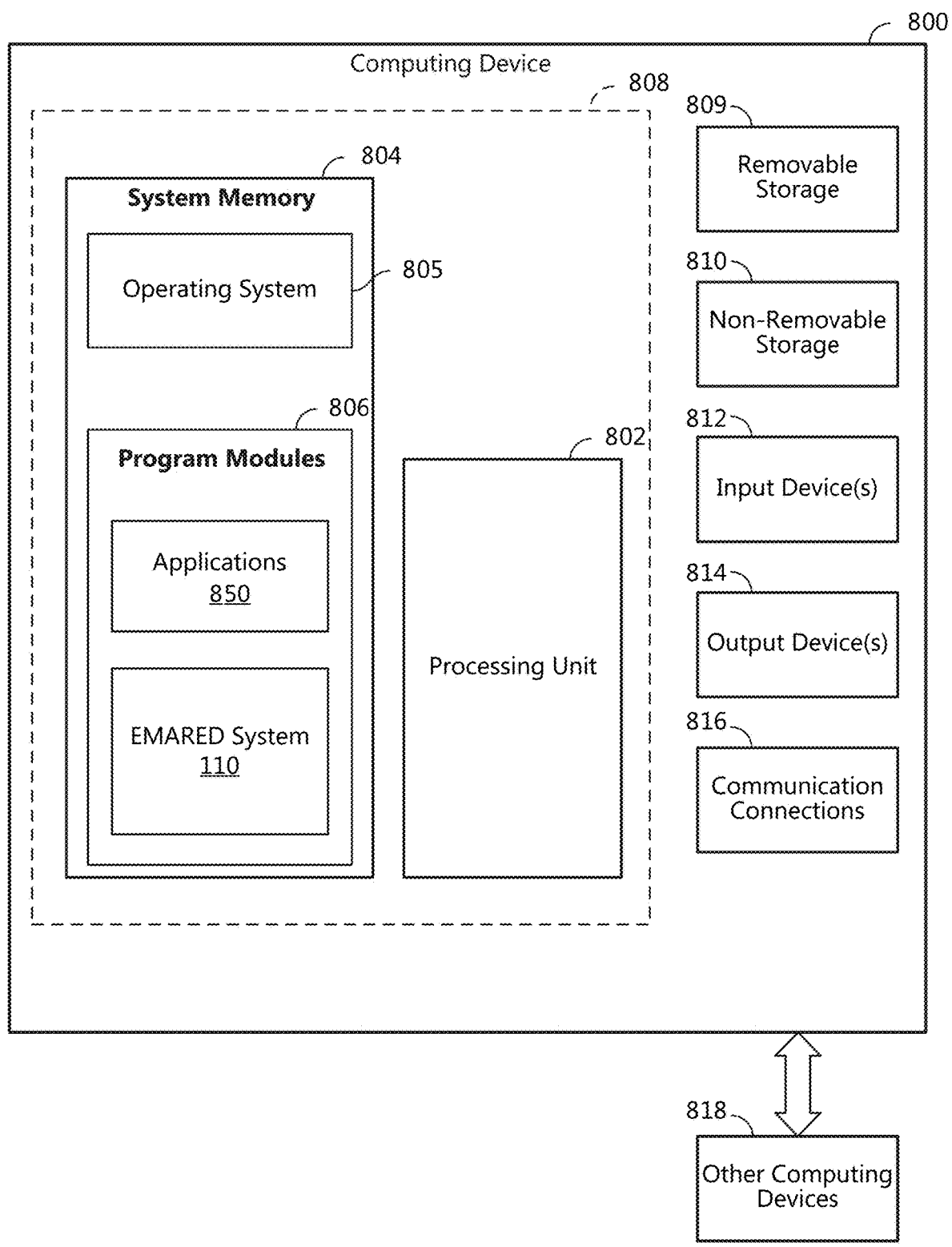
FIG. 8 is a block diagram illustrating example physical components of a computing device.
Figure 9A:
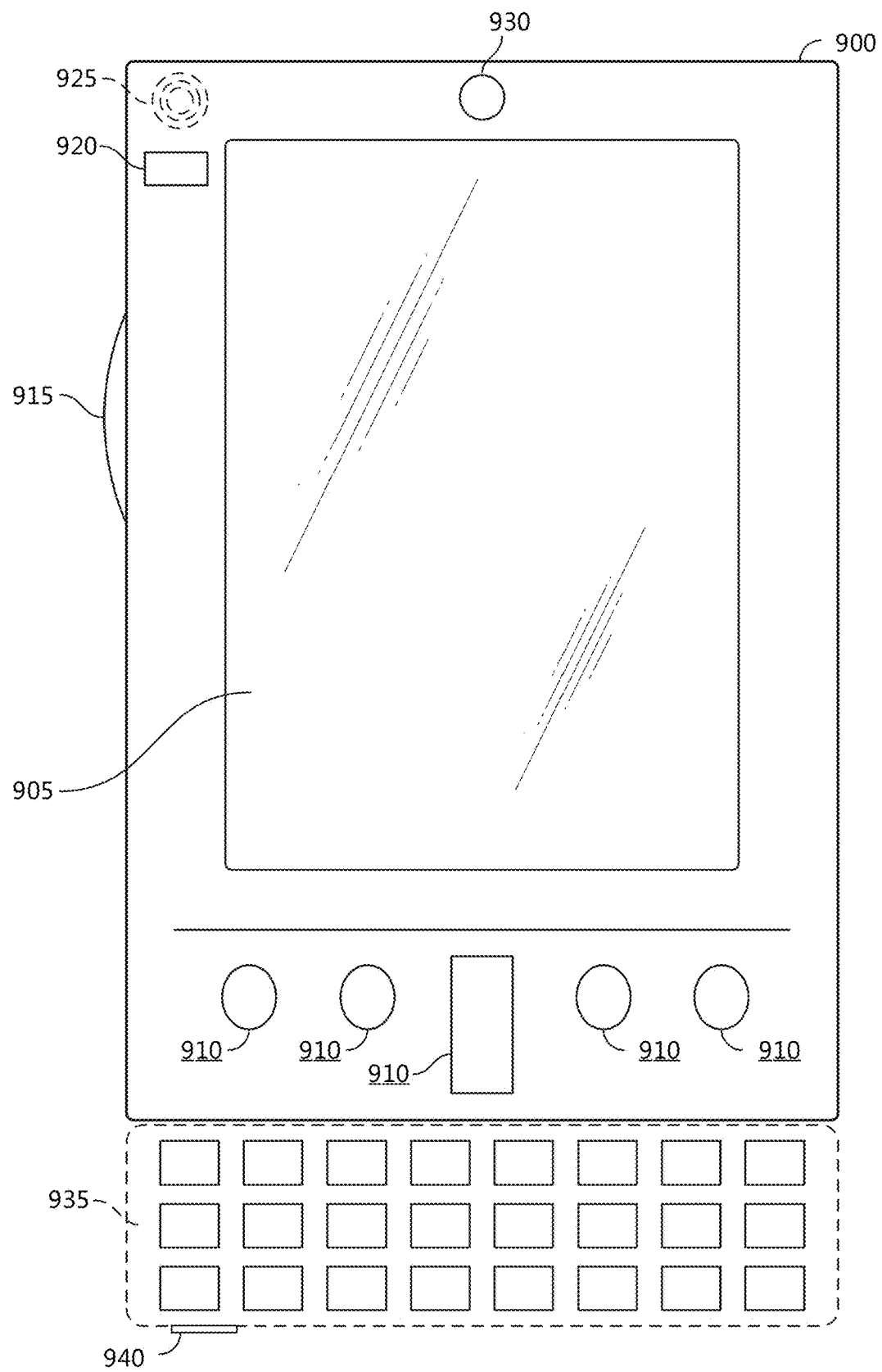
FIGS. 9A and 9B are block diagrams of a mobile computing device.
Figure 9B:
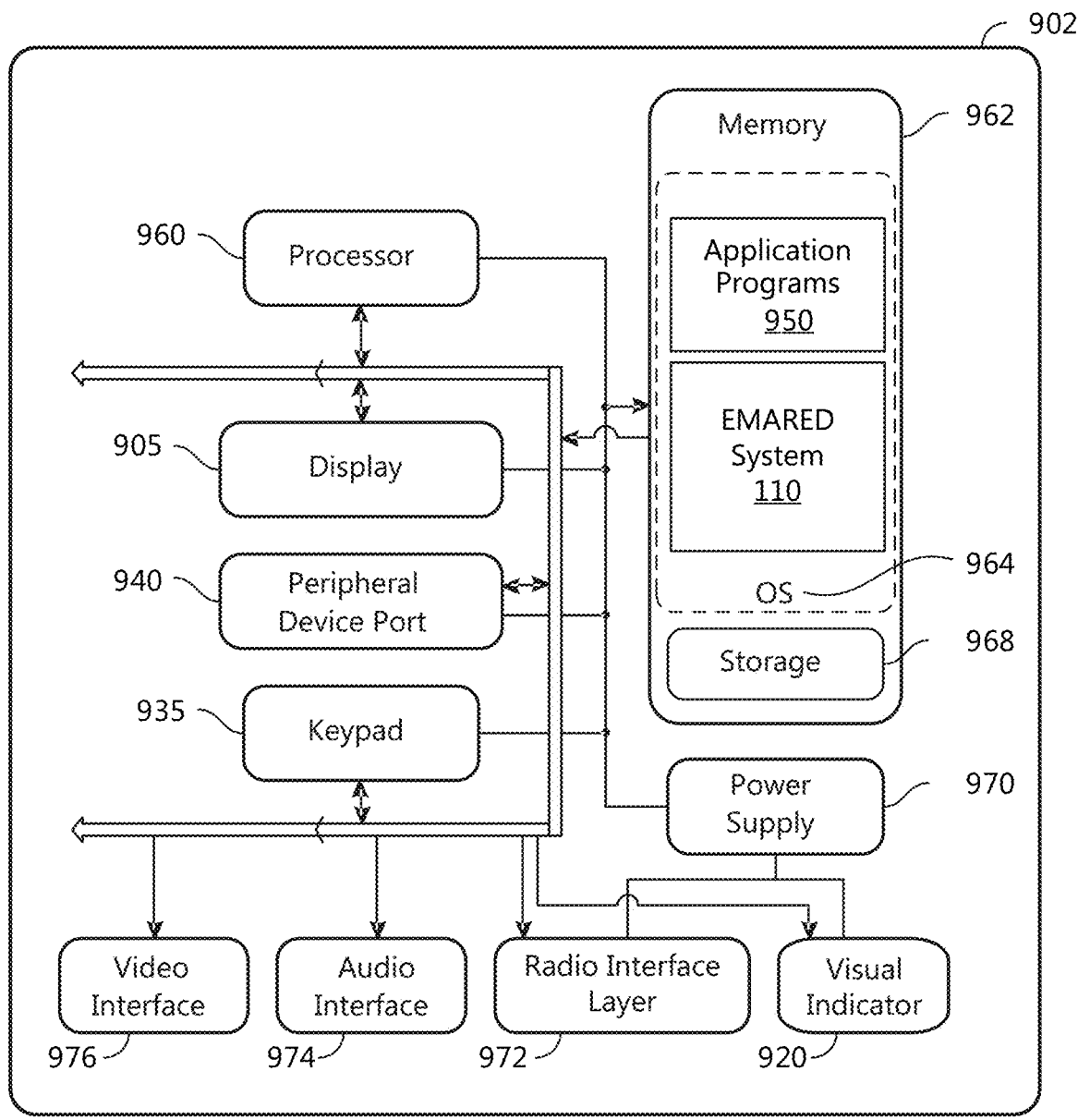
Figure 10:
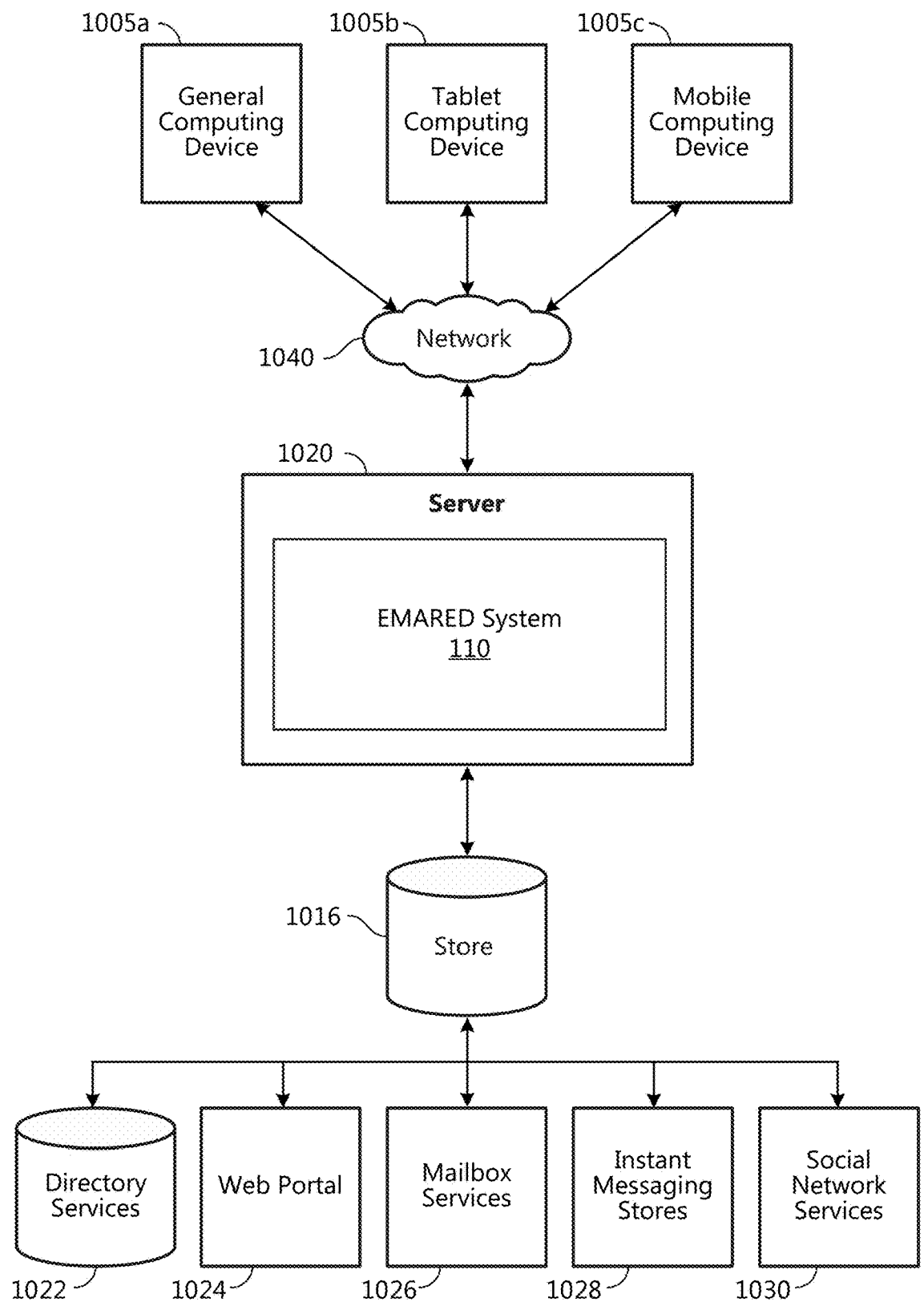
FIG. 10 is a block diagram of a distributed computing system.

FIGS. 8-10 and the associated descriptions provide a discussion of a variety of operating environments in which examples are practiced. However, the devices and systems illustrated and discussed with respect to FIGS. 8-10 are for purposes of example and illustration and are not limiting of a vast number of computing device configurations that are utilized for practicing aspects, described herein.

FIG. 8 is a block diagram illustrating physical components (i.e., hardware) of a computing device 800 with which examples of the present disclosure are practiced. In a basic configuration, the computing device 800 includes at least one processing unit 802 and a system memory 804. According to an aspect, depending on the configuration and type of computing device, the system memory 804 comprises, but is not limited to, volatile storage (e.g., random access memory), non-volatile storage (e.g., read-only memory), flash memory, or any combination of such memories. According to an aspect, the system memory 804 includes an operating system 805 and one or more program modules 806 suitable for running software applications 850. According to an aspect, the system memory 804 includes the EMARED system 110. The operating system 805, for example, is suitable for controlling the operation of the computing device 800. Furthermore, aspects are practiced in conjunction with a graphics library, other operating systems, or any other application program, and are not limited to any particular application or system. This basic configuration is illustrated in FIG. 8 by those components within a dashed line 808. According to an aspect, the computing device 800 has additional features or functionality. For example, according to an aspect, the computing device 800 includes additional data storage devices (removable and/or non-removable) such as, for example, magnetic disks, optical disks, or tape. Such additional storage is illustrated in FIG. 8 by a removable storage device 809 and a non-removable storage device 810.

As stated above, according to an aspect, a number of program modules and data files are stored in the system memory 804. While executing on the processing unit 802, the program modules 806 (e.g., EMARED system 110) perform processes including, but not limited to, one or more of the stages of the methods 600 and 700 illustrated in FIGS. 6 and 7. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 8 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 800 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 800 has one or more input device(s) 812 such as a keyboard, a mouse, a pen, a sound input device, a touch input device, etc. The output device(s) 814 such as a display, speakers, a printer, etc. are also included according to an aspect. The aforementioned devices are examples and others may be used. According to an aspect, the computing device 800 includes one or more communication connections 816 allowing communications with other computing devices 818. Examples of suitable communication connections 816 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. According to an aspect, any such computer storage media is part of the computing device 800. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 9A and 9B illustrate a mobile computing device 900, for example, a mobile telephone, a smart phone, a tablet personal computer, a laptop computer, and the like, with which aspects may be practiced. With reference to FIG. 9A, an example of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. According to an aspect, the display 905 of the mobile computing device 900 functions as an input device (e.g., a touch screen display). If included, an optional side input element 915 allows further user input. According to an aspect, the side input element 915 is a rotary switch, a button, or any other type of manual input element. In alternative examples, mobile computing device 900 incorporates more or less input elements. For example, the display 905 may not be a touch screen in some examples. In alternative examples, the mobile computing device 900 is a portable phone system, such as a cellular phone. According to an aspect, the mobile computing device 900 includes an optional keypad 935. According to an aspect, the optional keypad 935 is a physical keypad. According to another aspect, the optional keypad 935 is a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some examples, the mobile computing device 900 incorporates a vibration transducer for providing the user with tactile feedback. In yet another example, the mobile computing device 900 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 900 incorporates peripheral device port 940, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one example of a mobile computing device. That is, the mobile computing device 900 incorporates a system (i.e., an architecture) 902 to implement some examples. In one example, the system 902 is implemented as a "smart phone" capable of running one or more applications (e.g., browser, e-mail, calendaring, contact managers, messaging clients, games, and media clients/players). In some examples, the system 902 is integrated as a computing device, such as an integrated personal digital assistant (PDA) and wireless phone.

According to an aspect, one or more application programs 950 are loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. According to an aspect, the EMARED system 110 is loaded into memory 962. The system 902 also includes a non-volatile storage area 968 within the memory 962. The non-volatile storage area 968 is used to store persistent information that should not be lost if the system 902 is powered down. The application programs 950 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

According to an aspect, the system 902 has a power supply 970, which is implemented as one or more batteries. According to an aspect, the power supply 970 further includes an external power source, such as an AC adapter or a powered docking cradle that supplements or recharges the batteries.

According to an aspect, the system 902 includes a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 950 via the operating system 964, and vice versa.

According to an aspect, the visual indicator 920 is used to provide visual notifications and/or an audio interface 974 is used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. According to an aspect, the system 902 further includes a video interface 976 that enables an operation of an on-board camera 930 to record still images, video stream, and the like.

According to an aspect, a mobile computing device 900 implementing the system 902 has additional features or functionality. For example, the mobile computing device 900 includes additional data storage devices (removable and/or non-removable) such as, magnetic disks, optical disks, or tape. Such additional storage is illustrated in FIG. 9B by the non-volatile storage area 968.

According to an aspect, data/information generated or captured by the mobile computing device 900 and stored via the system 902 is stored locally on the mobile computing device 900, as described above. According to another aspect, the data is stored on any number of storage media that is accessible by the device via the radio 972 or via a wired connection between the mobile computing device 900 and a separate computing device associated with the mobile computing device 900, for example, a server computer in a distributed computing network, such as the Internet. As should be appreciated such data/information is accessible via the mobile computing device 900 via the radio 972 or via a distributed computing network. Similarly, according to an aspect, such data/information is readily transferred between computing devices for storage and use according to well-known data/information transfer and storage means, including electronic mail and collaborative data/information sharing systems.

FIG. 10 illustrates one example of the architecture of a system for event management and automated relevant event discovery as described above. Content developed, interacted with, or edited in association with the EMARED system 110 is enabled to be stored in different communication channels or other storage types. For example, various documents may be stored using a directory service 1022, a web portal 1024, a mailbox service 1026, an instant messaging store 1028, or a social networking site 1030. The EMARED system 110 is operative to use any of these types of systems or the like for providing event management and automated relevant event discovery, as described herein. According to an aspect, a server 1020 provides the EMARED system 110 to clients 1005a,b,c. As one example, the server 1020 is a web server providing the EMARED system 110 over the web. The server 1020 provides the EMARED system 110 over the web to clients 1005 through a network 1040. By way of example, the client computing device is implemented and embodied in a personal computer 1005a, a tablet computing device 1005b or a mobile computing device 1005c (e.g., a smart phone), or other computing device. Any of these examples of the client computing device are operative to obtain content from the store 1016.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for improving efficiency in a computer device providing automated relevant event discovery, comprising:
    collecting, by a relevancy engine of an event management system, user information from a user data store of the event management system, the user information comprising real-time location information for a user and a time frame associated with the user;
    collecting and storing, by the relevancy engine, event information from an events data store of the event management system, the event information comprising a time, a location, and a category for one or more events, wherein at least a portion of the event information is collected from one or more event providers each having a verified account with the event management system;
    querying, by the relevancy engine, a calendar application associated with the user for time availability of the user within the time frame, wherein the calendar application is implemented on the computer device and the relevancy engine interacts with the calendar application via a calendar API of the event management system;
    based on results of the querying, identifying, by the relevancy engine, events that occur, at least in part, during the time frame;
    determining, by the relevancy engine, a first relevancy score for each of the identified events, wherein the first relevancy score is based on one or more weighted relevancy factors associated with at least one of: user preferences of the user and friend activity of the user;
    providing for display each of the identified events as a functional event card, wherein display order of each functional event card is based on at least the first relevancy score for a corresponding identified event and the functional event card comprises:
        a first notification that the user does not have a conflict attending a respective identified event; and
        a second notification of whether one or more friends of the user are attending the respective identified event; and
    receiving a selection, by the user, of functionality provided by one or more displayed functional event cards.

2. The computer-implemented method of claim 1, further comprising:
    prioritizing the identified events based at least in part on whether an event is associated with an event category that is of interest to the user.

3. The computer-implemented method of claim 1, further comprising: prioritizing the identified events based at least in part on whether the user has attended a past event related to one or more of the identified events.

4. The computer-implemented method of claim 1, wherein identifying events that are relevant to the user comprises searching for events based on event location.

5. The computer-implemented method of claim 1, wherein each of the one or more displayed functional event cards comprises at least two of:
    an event title;
    a name of a performer, entertainer, speaker, or organization associated with the event;
    an image;
    an audio clip;
    a video clip;
    an event date and time;
    an event location;
    an admission price; or
    a link to a website associated with the event.

6. The computer-implemented method of claim 5, wherein each of the one or more displayed functional event cards comprises at least one of:
    a functionality to purchase tickets to the event;
    a functionality to RSVP to the event;
    a functionality to post the event to a pole;
    a functionality to share the event with friends or contacts;
    a functionality to send a communication to the event provider; or
    a functionality to search for similar events.

7. The computer-implemented method of claim 6, wherein in response to receiving a selection of the functionality to post the event to the pole, the event is classified as an event of interest for the user.

8. The computer-implemented method of claim 6, further comprising:

receiving a selection to view the pole; and
providing for display one or more events that have been classified as events of interest for the user.

9. The computer-implemented method of claim 7, further comprising providing a functionality for sharing the pole with another user.

10. The computer-implemented method of claim 1, further comprising receiving event information associated with a plurality of events by crawling a network.

11. The computer-implemented method of claim 10, wherein receiving event information associated with the plurality of events comprises collecting event information from web pages associated with the one or more known event providers, the one or more known event providers being associated with other managed events.

12. The computer-implemented method of claim 1, further comprising:
   determining a second relevancy score for each of the identified events based on a match between a respective identified event and a location of the user; and
   wherein the display order of the identified events is further based on the second relevancy score for each of the identified events.

13. The computer-implemented method of claim 12, further comprising:
   determining a third relevancy score for each of the identified events based on a match between the timeframe and an event time for a respective identified event; and
   wherein the display order of the identified events is further based on the third relevancy score for each of the identified events.

14. The computer-implemented method of claim 1, wherein:
   each of the identified events is associated with a topic category; and
   each functional event card is arranged and displayed according to the topic category of the identified event corresponding to the functional event card.

15. An event management system comprising:
   a processor; and
   memory coupled to the processor, the memory comprising computer executable instructions that, when executed by the processor, performs a method comprising:
      collecting, by a relevancy engine of the event management system, user information from a user data store of the event management system, the user information comprising location information for a user and a time frame associated with the user;
      collecting and storing, by the relevancy engine, event information from an events data store of the event management system, the event information comprising a time, a location, and a category for one or more events;
      querying, by the relevancy engine, an electronic calendar associated with the user for time availability of the user within the time frame, wherein the relevancy engine interacts with the electronic calendar via a calendar API of the event management system;
      based on results of the querying, identifying, by the relevancy engine, events that occur, at least in part, during the time frame;
      determining, by the relevancy engine, a first relevancy score for each of the identified events, wherein the first relevancy score is based on one or more weighted relevancy factors associated with at least one of: user preferences of the user and friend activity of the user;
      providing for display the identified events as functional event cards, the display order of the functional event cards being based on at least the first relevancy score for corresponding identified events, wherein at least one functional event card of the functional event cards comprises functionality to post an identified event to a pole;
      receiving a selection, by the user, of the functionality to post the identified event to the pole, the selection causing the identified event to be identified as an event of interest to the user; and
      when a request to view the pole is received, providing for display one or more events classified as events of interest to the user.

16. The system of claim 15, the method further comprising:
   prioritizing the identified events based on an event category of interest to the user and whether the user has attended a past event related to the identified events.

17. The system of claim 15, wherein in identifying events that are relevant to the user comprises searching for events based on a location of the user on a date of an identified event and a location of previous events attended by the user.

18. The system of claim 15, wherein a data miner collects the event information from web pages associated with event providers associated with other managed events, the event providers having one or more verified accounts with the system.

19. The system of claim 15, wherein each of the one or more displayed functional event cards comprises at least two of:
   an audio clip associated with an identified event;
   a video clip associated with an identified event; or
   a link to a website associated with an identified event.

20. A computer readable storage device including instructions, which when executed by a processor are operable to perform steps comprising:
   collecting, by a relevancy engine of an event management system, user information from a user data store of the event management system, the user information comprising real-time location information for a user and a time frame associated with the user;
   collecting and storing, by the relevancy engine, event information from an events data store of the event management system, the event information comprising a time, a location, and a category for one or more events;
   querying, by the relevancy engine, an electronic calendar associated with the user for time availability of the user within the time frame, wherein the relevancy engine interacts with the electronic calendar via a calendar API of the event management system;
   based on results of the querying, identifying, by the relevancy engine, events that occur, at least in part, during the time frame;
   determining, by the relevancy engine, a first relevancy score for each of the identified events, wherein the first relevancy score is based on one or more weighted relevancy factors associated with friend activity of the user;
   prioritizing one or more identified events that are relevant to the user based on at least one of:
      a distance to the one or more identified events;

a distance between the one or more identified events and a location of previous events attended by the user; and
   an event category of interest to the user;
displaying the prioritized one or more identified events to the user as functional event cards, the display order of the functional event cards being based on at least the first relevancy score for a corresponding identified event, wherein at least one functional event card of the functional event cards comprises:
   a first notification that the user does not have a conflict attending a respective identified event;
   a second notification of whether one or more friends of the user are attending the respective identified event; and
   functionality to post an identified event to a pole; and
receiving a selection, by the user, of the functionality to post the identified event to the pole, the selection causing the identified event to be identified as an event of interest to the user.

* * * * *